US012789825B2

(12) United States Patent
Olson et al.

(10) Patent No.: US 12,789,825 B2
(45) Date of Patent: Nov. 10, 2026

(54) MONTE CARLO POLICY TREE DECISION MAKING

(71) Applicant: THE REGENTS OF THE UNIVERSITY OF MICHIGAN, Ann Arbor, MI (US)

(72) Inventors: Edwin Olson, Ann Arbor, MI (US); Acshi Haggenmiller, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 363 days.

(21) Appl. No.: 18/074,944

(22) Filed: Dec. 5, 2022

(65) Prior Publication Data

US 2023/0174084 A1 Jun. 8, 2023

Related U.S. Application Data

(60) Provisional application No. 63/264,977, filed on Dec. 6, 2021.

(51) Int. Cl.
*B60W 50/06* (2006.01)
*B60W 30/14* (2006.01)
(Continued)

(52) U.S. Cl.
CPC .......... *B60W 50/06* (2013.01); *B60W 30/143* (2013.01); *B60W 30/18163* (2013.01);
(Continued)

(58) Field of Classification Search
CPC ............. B60W 50/06; B60W 60/0015; B60W 30/143; B60W 30/18163; G06F 16/2246; G06F 16/2455; G06N 5/022
(Continued)

(56) References Cited

U.S. PATENT DOCUMENTS 11,681,896 B2 * 6/2023 Olson .................... G06N 3/008 706/26
11,900,797 B2 * 2/2024 Ramamoorthy .. B60W 60/0015
(Continued)

FOREIGN PATENT DOCUMENTS

KR 10-2013-0074310 A 7/2013

OTHER PUBLICATIONS

Entropy-Based Adaptive Exploit-Explore Coefficient for Monte-Carlo Path Planning Authors: Ana Raquel Carmo, Jean-Alexis Delamer, Yoko Watanabe, Rodrigo Ventura, Caroline P.C. Chanel pp. 2964-2971 Series: Frontiers in Artificial Intelligence and Applications (Year: 2020).*

(Continued)

*Primary Examiner* — Christian Chace
*Assistant Examiner* — Richard Edwin Geist
(74) *Attorney, Agent, or Firm* — Harness, Dickey & Pierce, P.L.C.

(57) ABSTRACT

An uncertainty-aware framework is presented for high-variance planning problems with multiple dynamic agents. Planning when surrounded by multiple uncertain dynamic agents is hard because one cannot be certain of either the initial states or the future actions of those agents, leading to an exponential explosion in possible futures. Many important real-world problems, such as autonomous driving, fit this model. To address these difficulties, Multi-policy Decision Making (MPDM) and Monte Carlo tree search (MCTS) are combined and a policy tree search performed with marginal action cost estimation and repeated belief particles.

20 Claims, 15 Drawing Sheets

(51) Int. Cl.
*B60W 30/18* (2012.01)
*B60W 60/00* (2020.01)
*G06F 16/22* (2019.01)
*G06F 16/2455* (2019.01)
*G06N 5/01* (2023.01)
*G06N 5/022* (2023.01)

(52) U.S. Cl.
CPC ..... *B60W 60/0015* (2020.02); *G06F 16/2246* (2019.01); *G06F 16/2455* (2019.01); *G06N 5/01* (2023.01); *G06N 5/022* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 12,039,860 | B2 * | 7/2024 | Ramamoorthy .. | B60W 60/0013 |
| 12,046,131 | B2 * | 7/2024 | Ramamoorthy ......... | G06N 7/01 |
| 2016/0350660 | A1 | 12/2016 | Horvitz et al. | |
| 2018/0089563 | A1 | 3/2018 | Redding et al. | |
| 2020/0363800 | A1 * | 11/2020 | Jojo-Verge ......... | B60W 60/0011 |
| 2020/0387158 | A1 | 12/2020 | Kobilarov et al. | |
| 2021/0370980 | A1 | 12/2021 | Ramamoorthy et al. | |
| 2024/0202393 | A1 * | 6/2024 | Dobre ............... | B60W 60/0013 |
| 2024/0275691 | A1 * | 8/2024 | Kattepur ................ | G06N 20/00 |

OTHER PUBLICATIONS

Galceran, E., Cunningham, A.G., Eustice, R.M. et al. Multipolicy decision-making for autonomous driving via changepoint-based behavior prediction: Theory and experiment. Autonomous Robots 41, pp. 1367-1382 (2017). (Year: 2017).*

Zhang, Lu, Wenchao Ding, Jing Chen, and Shaojie Shen. "Efficient uncertainty-aware decision-making for automated driving using guided branching." In 2020 IEEE International Conference on Robotics and Automation (ICRA), pp. 3291-3297. IEEE, 2020. (Year: 2020).*

Ghosh, Dibya, et al. "Divide-and-Conquer Reinforcement Learning." International Conference on Learning Representations. 2018. (Year: 2018).*

Montgomery, William, et al. "Reset-free guided policy search: Efficient deep reinforcement learning with stochastic initial states." 2017 IEEE International Conference on Robotics and Automation (ICRA). IEEE, 2017. (Year: 2017).*

Cunningham, Alexander G., et al. "MPDM: Multipolicy decision-making in dynamic, uncertain environments for autonomous driving." 2015 IEEE International Conference on Robotics and Automation (ICRA). IEEE, 2015. (Year: 2015).*

International Search Report and Written Opinion regarding International Patent Application No. PCT/US2022/051958, dated Apr. 17, 2023.

David Silver et al: "Monte-Carlo Planning in Large POMDPs", Jan. 1, 2010 (Jan. 1, 2010), XP055427825, Retrieved from the Internet: URL:https://papers.nips.cc/paper/4031-monte-carlo-planning-in-large-pomdps.pdf [retrieved on Nov. 22, 2017].

Haggenmiller Acshi et al: "Monte-Carlo Policy-Tree Decision Making", Jul. 1, 2022 (Jul. 1, 2022), pp. 1-13, XP093328113, DOI: 10.31219/osf.io/ebd58 Retrieved from the Internet: URL:https://scholar.archive.org/work/pkuwszlovzhpvirfqfyideqjta/access/wayback/https ://files.osf.io/v1/resources/ebd58/providers/osfstorage/62dae0a9f66a944dca230368?action=download&direct&version=1.

Extended European Search Report Issued in Related Application EP 22 90 5004, Dated Nov. 3, 2025.

* cited by examiner

MONTE CARLO POLICY TREE DECISION MAKING

CROSS REFERENCE TO RELATED APPLICATION

This application claims the benefit of U.S. Provisional Application No. 63/264,977, filed Dec. 6, 2021. The entire disclosure of the above application is incorporated herein by reference.

GOVERNMENT CLAUSE

This invention was made with government support under 1830615 awarded by the National Science Foundation. The government has certain rights in the invention.

FIELD

The present disclosure generally relates to tree decision making framework for problems where the marginal costs of each action are available and important, such as autonomous vehicle planning.

BACKGROUND

Planning with uncertainty is difficult because uncertainty compounds and marginalizing over each source of uncertainty is exponential in the number of possibilities. First, the space of possible action sequences increases exponentially with the length of the planning horizon and the number of dynamic agents. Second, uncertainty about the future world necessarily increases the further into the future we plan. The first difficulty poses computational challenges, while the second means that continuous re-planning is necessary to take advantage of new information.

Planning under uncertainty is often modelled as a Partially Observable Markov Decision Process (POMDP), with a discrete set of states, actions, and observations, and with probabilistic state transition, observation, and reward functions. Exactly solving a real-world POMDP is intractable because of the exponential nature of the probabilistic belief space. Tools that approximately solve the exact POMDP are still only tractable for small discrete problems. More realistically, this computational cost can be made tractable through use of heuristics, sampling approaches, or domain-specific modeling simplifications. Even so, the number of future scenarios to consider is still an exponential function of the number of possible actions (branching factor) and the length of the horizon (search depth). A brute-force tree search over all possible plans will only be possible when the action space is both discrete and small, the horizon is short, and the time discretization is coarse.

A Multi-Policy Decision-Making (MPDM) framework is helpful for these kinds of planning problems because computation time is linear in both the number of policies and the length of the planning horizon. Instead of planning in action space and directly considering each possible control input, MPDM plans in policy space and only considers selecting from high-level closed-loop policies that encode domain-specific behaviors. MPDM handles uncertainty in other dynamic agents by sampling their states and assuming that they are also following policies, again limiting the computational complexity. By having policies that encode the breadth of reasonable behaviors for both the ego (the agent that we are planning for) and other agents, MPDM takes advantage of prior domain knowledge to avoid searching extremely unlikely and unrealistic portions of the complete search tree. Policies can also be used for both discrete and continuous action spaces. Besides both the ego agent and other agents being restricted to following a policy, MPDM is also limited in that it does not consider the possibility of switching policies within the planning horizon. This makes certain larger-scale behaviors, such as an autonomous vehicle passing another vehicle and then returning to its original lane, much more awkward to handle.

Efficient Uncertainty-Aware Decision-Making (EUDM) extends MPDM to help get around this limitation by using a tree search to allow up to one policy change at some future point in the planning horizon and also by using heuristics to identify situations with the obstacle agents that may lead to dangerous situations. This helps EUDM more effectively marginalize over uncertainty in the initial states and plans of the other agents. Even with policies, however, the number of possible initial belief states is still exponential in the number of obstacle vehicles to plan around.

This disclosure makes further improvements to MPDM to get around the limitation of a single policy change and necessity of using critical-situation heuristics by combining insights from both MPDM and Monte Carlo Tree Search (MCTS) along with additional novel modifications that take advantage of the unique cost-structure and focus on safety in autonomous driving and other similarly structured tasks.

This section provides background information related to the present disclosure which is not necessarily prior art.

SUMMARY

This section provides a general summary of the disclosure, and is not a comprehensive disclosure of its full scope or all of its features.

A computer-implemented method is presented for issuing a command to a controlled object in a monitored environment. The method includes: receiving an initial state estimate for the controlled object and one or more monitored objects in the monitored environment, wherein the initial state estimate includes state elements, and the state elements are indicative of a position for the respective objects, a velocity for the respective objects and an intent of the respective objects; constructing a policy tree for evaluating actions taken by the controlled object during an evaluation period, such that each level of the policy tree represents a time interval during the evaluation period, each edge of the policy tree represents a policy to be followed by the controlled object, and each node of the policy tree stores an indicator of outcomes for the controlled object following policies defined by the path to the given node, wherein policies are selected from a set of possible policies; generating one or more state estimates for the controlled object and the one or more monitored objects from the initial state estimate, where each state estimate in the one or more state estimates includes state elements, and the state elements are indicative of a position for the respective objects, a velocity for the respective objects and an intent of the respective objects; evaluating outcome of one or more paths in the policy tree using the one or more state estimates; selecting a given path in the policy tree having best outcome for the controlled object, where the given path indicates a sequence of policies to be followed by the controlled object during the evaluation period; and issuing a command to the controlled object in accordance with the sequence of policies.

Prior to evaluating the outcomes of the one or more paths in the policy tree, the policy tree may be constructed. In some embodiments, outcomes of the one or more paths in the policy tree are evaluated using a Monte Carlo tree search.

In one aspect, outcomes of one or more paths in the policy tree are evaluated by evaluating a given path in the policy tree with a given state estimate yields a cost at each node in the given path in accordance with a cost function; and assigning an expected cost to each node in the given path, where the expected cost at a given node in the given path is determined by computing a mean expected cost at each leaf node which depends from the given node and setting the expected cost for the given node equal to average of mean expected costs at each leaf node which depends from the given node.

In another aspect, outcomes of the one or more paths in the policy tree may be evaluated by evaluating a given path in the policy tree with a given state estimate yields a cost at each node in the given path in accordance with a cost function; and assigning a marginal expected cost to each node in the given path, where the marginal expected cost at a given node is set to mean of marginal costs resulting from evaluating state estimates at the given node plus marginal expected cost from a particular child node of the given node, such that marginal expected cost of the particular child node is smallest amongst the child nodes of the given node.

In yet another aspect, outcomes of one or more paths in the policy tree are evaluated by evaluating each child node of the root node of the policy tree with a first state estimate chosen from the plurality of state estimates before evaluating paths in the policy tree using another state estimate which differs from the first state estimate.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Figure 13:
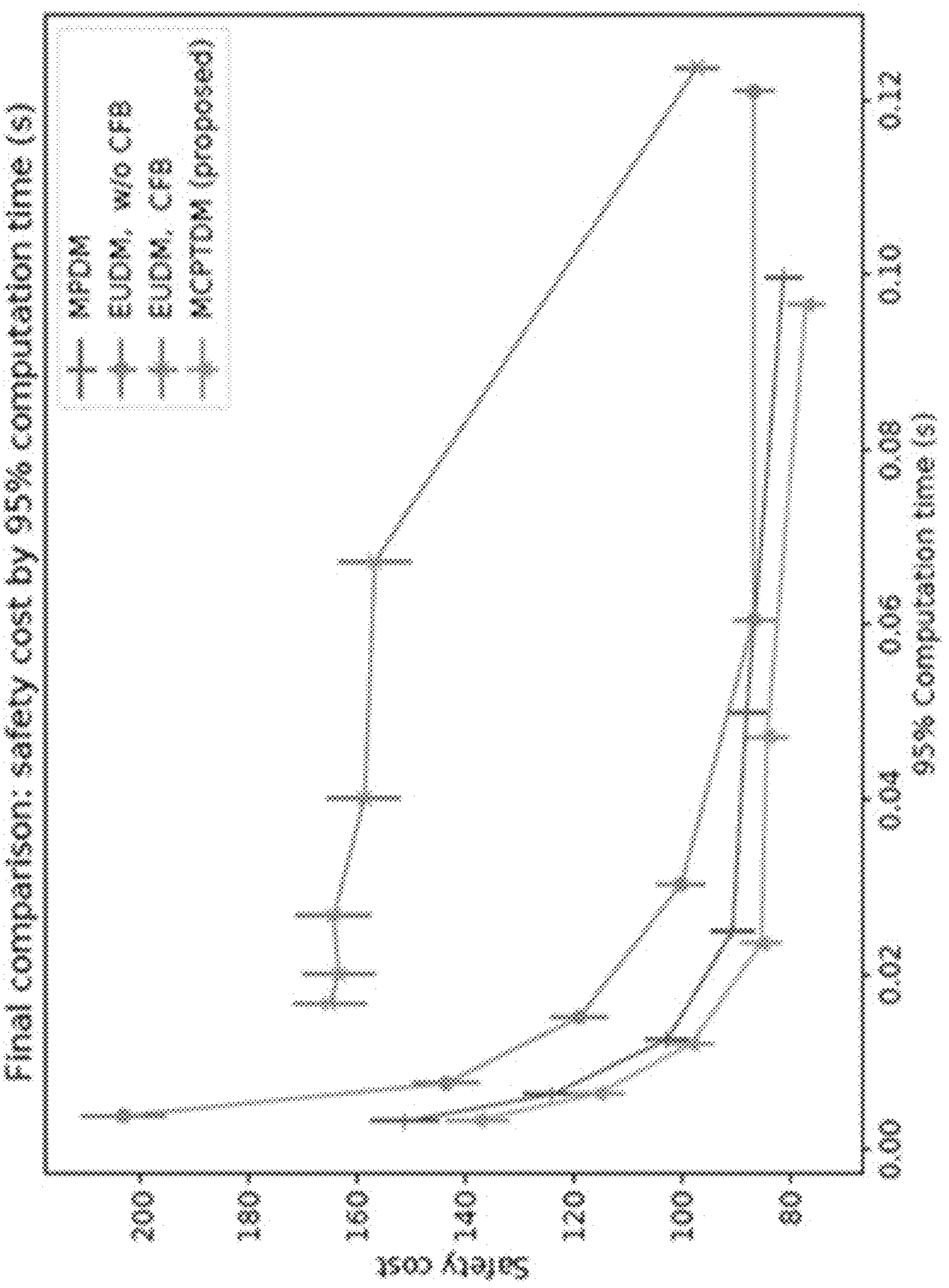
FIG. 13 is a graph showing a comparison of just the final safety cost (lower is better) between each method. At all computation times, MPDM is only slightly less safe that MCPTDM. For larger computation times, EUDM is also very similar. Compare with FIG. 14 and the plot of just the efficiency cost.

MCPTDM is quick to worsen efficiency (for better safety) and also keeps the efficiency cost relatively low as the computational budget increases. Compare with FIG. 13 and the plot of just the safety cost.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Monte-Carlo Policy-Tree Decision Making (MCPTDM) is examined with a synthetic scenario and experiments that model an abstract form of the self-driving scenario. After describing this scenario in detail, this disclosure examines the effects of changing the expected cost rule used by upper confidence bound (UCB) for balancing the exploration exploitation tradeoff and for selecting the final best action. This disclosure also examines the effects of various improvements to UCB. Finally, this disclosure explores the idea of fairness with particle repetition, helping to mitigate the effects of "unlucky" initial conditions, where poor outcomes are more attributable to the initial conditions than the specific plan being evaluated. In a self-driving situation, for example, an "unlucky" particle might include nearby vehicles having intentions that box the ego vehicle in while another vehicle performs a dangerous lane-change; boxed in like this, it doesn't matter which policy the ego vehicle chooses, even though this random coordination is very unlikely.

For illustration purposes, this disclosure considers an abstract version of an autonomous driving task with five policy (or action) choices, an evaluation period (i.e., time horizon) split into four segments or time intervals, and costs related to avoiding crashes and close calls and making forward progress. It is readily understood that more or less policy choices can be implemented as well as more or less time intervals. It is also envisioned that costs may be assigned based on other events related to the driving or otherwise differ depending on the application.

While costs associated with making forward progress are likely to be relatively smooth, costs around safety and potentially crashing are more discontinuous. To model a more complex cost distribution, this disclosure uses a mixture of two Gaussians in an example embodiment. Gaussian mixtures have prior use in compactly approximating real-world events. Other types of probabilistic models are contemplated by this disclosure as well.

In addition, in a self-driving scenario, a lot of the uncertainty is in the initial belief about the behavior and intentions of other vehicles. Specific initial conditions that might be dangerous for one ego-agent policy are likely to be dangerous for the other policies as well. To model this "risky situation" correlation, the initial conditions are stored in what is referred to herein as belief particles. If the same belief particles are propagated through different paths in the tree, one should see correlated responses.

Figure 1:
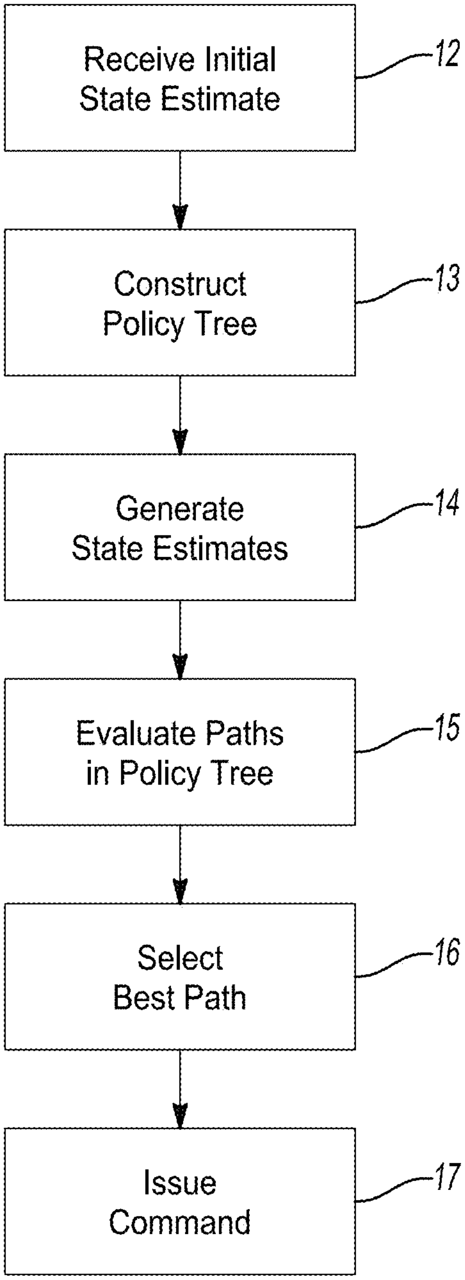
FIG. 1 is a diagram of a computer-implemented method for issuing a command to a controlled object in the self-driving scenario.

FIG. 1 provides an overview of a computer-implemented method for issuing a command to a controlled object, such as an autonomous vehicle, in the self-driving scenario. As a starting point, an initial state of the objects in the monitored environment is determined as indicated at 12. Objects include the autonomous vehicle (i.e., the controlled object) and other monitored objects in the monitored environment, such as pedestrians, other vehicles, etc. The initial state estimate is comprised of state elements for the controlled object and each of the monitored objects. In the self-driving scenario, the state elements for each object include an indication of a position for the respective object, a velocity for the respective object and an intent of the respective object. Other types of state elements can be modeled as well.

A policy tree is used for evaluating actions taken by the controlled object during the evaluation period. Each level of the policy tree represents a time interval during the evaluation period. For example, the evaluation period may be split into four time intervals, where each time interval is one second in a four second evaluation period. Each edge of the policy tree represents a policy to be followed by the controlled object, and each node of the policy tree stores an indicator of outcomes for the controlled object following policies defined by the path to the given node.

Policies are selected from a set of possible policies. In one example, the set of possible policies includes maintain velocity in current lane, change to lane on right, change to lane on left and decelerate. In another example, the set of policies includes maintain speed in current lane, accelerate in current lane, change to lane on right while maintaining speed, change to lane on right while accelerating, change to lane on left while maintaining speed, change to lane on left while accelerating and decelerate. These policies are merely illustrative and this disclosure is not limited to these particular policies or combinations thereof.

From the initial state estimate, one or more state estimates are generated at 14 for the controlled object and the one or more monitored objects. Again, each state estimate is comprised of state elements for the controlled object and state elements for each of the monitored objects, where the state elements for a respective object includes an indication of a position for the respective object, a velocity for the respective object and an intent of the respective object.

In an example embodiment, each node is assigned a random cost probability distribution that is a mixture of two Gaussian distributions with random mean $\mu_i$, standard deviation $\sigma_i$, and mixture weight $w_i$, where the mixture weights sum to one. Because this model includes only positive costs, these Gaussian costs are saturated to be in the range $[0, 2\mu_i]$ so that the mean is not changed by the saturation.

When running a trial, a "belief particle" (i.e., state estimate) is sampled from the initial state estimate so that all costs using this belief particle will be correlated. This can be done by sampling z-scores from the standard Gaussian distribution (a z-score is a normalized Gaussian sample, where $z=(x-\mu)/\sigma$. A weight threshold t is also sampled from 0 to 1 which will be use to select between the Gaussian mixture components. With these z-scores and threshold $z_1$, $z_2$, t from the belief particle known, the cost c for all node distributions would be both correlated and deterministic:

$$c = \begin{cases} \text{constrain}\,(\mu_1 + z_1\sigma_1,\ 0,\ 2\mu_1) & t \le w_1 \\ \text{constrain}\,(\mu_2 + z_2\sigma_2,\ 0,\ 2\mu_2) & t > w_1 \end{cases} \qquad (1)$$

-continued $$\text{constrain}(x, l, h) = \begin{cases} l & x < l \\ h & x > h \\ x & \text{otherwise} \end{cases} \quad (2)$$

When sampling node distributions, Gaussian means and standard deviations are all sampled uniformly and independently from 0 to 100. The true marginal expected cost of any node i is then:

$$E(c\bar{i})=w_{i,1}\mu_{i,1}+(1-w_{i,1})\mu_{i,2} \quad (3)$$

Other types of probability distribution models also fall within the broader aspects of this disclosure.

Next, outcomes of one or more paths in the policy tree are evaluated recursively at 15 using the one or more state estimates. For a given path and a given state estimate, a forward simulation is performed. The forward simulation yields a cost at each node in the given path in accordance with a cost function. A simplified cost function is set forth below. In this example, the cost function is defined in terms of velocity of the controlled object, a target velocity for the controlled object, and a minimum distance between the controlled object and the other monitored objects. Different and more sophisticated cost functions are envisioned by this disclosure. The computed costs are stored at the associated nodes. It is readily understood that the costs may be stored in different forms. For example, each cost may be stored individually at a given node or the costs may be stored cumulatively, along with a total number of costs, stored in an accumulator. Additionally, the costs may be stored as marginal costs as will be further described below.

With continued reference to FIG. 1, a given path in the policy tree having best outcome for the controlled object is selected as indicated at 16, where the given path indicates a sequence of policies to be followed by the controlled object during the evaluation period. In one example, the path having the best outcome for the controlled object is selected by identifying a child node of the root node of the policy tree having smallest marginal expected cost as further described below and implementing policy associated with the edge extending between the root node and the identified child node. Other path selection methods also fall within the broader aspects of this disclosure. Lastly, a command is issued at 17 to the controlled object in accordance with the sequence of policies.

In some embodiments, the entire policy tree is constructed prior to evaluating the outcomes of one or more paths in the policy tree. In other embodiments, the policy tree is constructed dynamically while evaluating outcomes of the one or more paths, for example using a Monte Carlo tree search.

To evaluate different paths in the policy tree, expected costs are assigned to each node along an evaluated path. Different expected cost rules can be applied to determine and assign an expected cost to the nodes of the policy tree. In one example, an expected cost is assigned to nodes along a path being evaluated in the policy tree. More specifically, the expected cost at a given node in the given path is determined by computing a mean expected cost at each leaf node which depends from the given node and setting the expected cost for the given node equal to average of the mean expected cost at each leaf node which depends from the given node. In another example, a marginal expected cost is assigned to nodes along a path as will be further described below. Other expected cost rules may be consider within the scope of this disclosure.

Marginal action costs (MACs) is further described below and allows one to make a more informed exploration of the search tree as compared to just using terminal costs (i.e., at leaf nodes). To put this idea in context, a common application of Monte Carlo tree search (MCTS) is for board games, such as Go, which involve many turns, a large branching factor, determinism, and a reward/cost assigned only when a terminating condition is reached (e.g. win/loss). By comparison, in a non-deterministic self-driving car scenario, while there may be a long-term goal (e.g. a destination to reach), the most important goal of the planner is to maintain safety at all times. To this end, marginal action costs allow the search to distinguish, for example, between a collision at depth 1 and depth 4, and due to the high cost of collisions, the entire sub-tree below a collision can be effectively pruned away. This is only possible when the collision can be attributed to a specific node.

The expected cost assigned to nodes may be used at two different points in MCTS. In the first case, they are inputs to the UCB selection algorithm for guiding the exploration exploitation tradeoff in search. In the second case, after the computational budget for MCTS trials is met, they may be used for final action selection, to select the final top level action to execute. Besides using the expected-cost, a common alternative is to choose the most-visited action as the final choice. A slight improvement may be found by continuing to search until both these measures agree and so one can use that combined "max-robust child" variation, putting a limit of 20% on the number of additional trials one might run. This explicit limit is only necessary because some of the parameter sweeps performed include degenerate cases that do not converge.

Figure 2A:
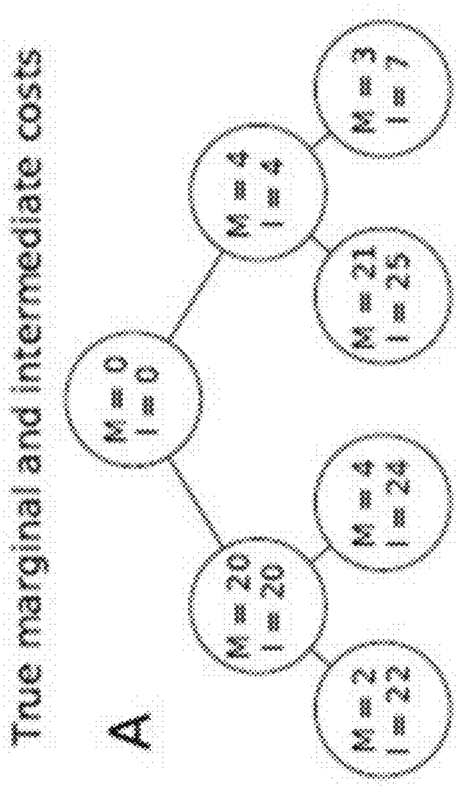
FIG. 2A is a diagram of an example policy tree showing the true marginal and intermediate costs.
Figure 2B:
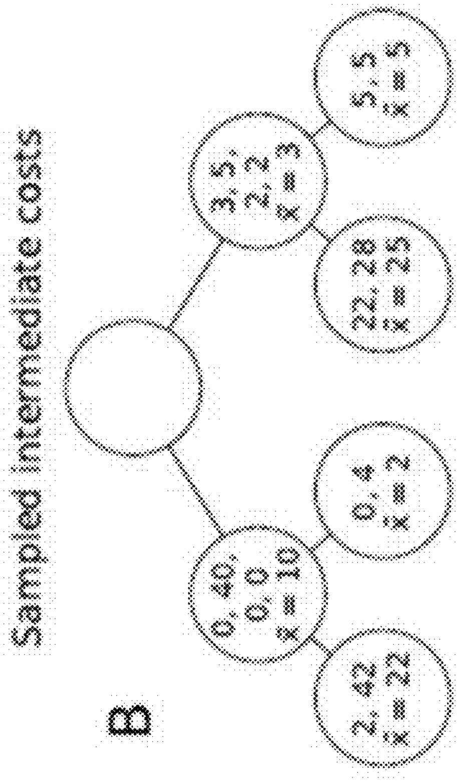
FIG. 2B is a diagram of the example policy tree showing sampled intermediate costs.
Figure 2C:
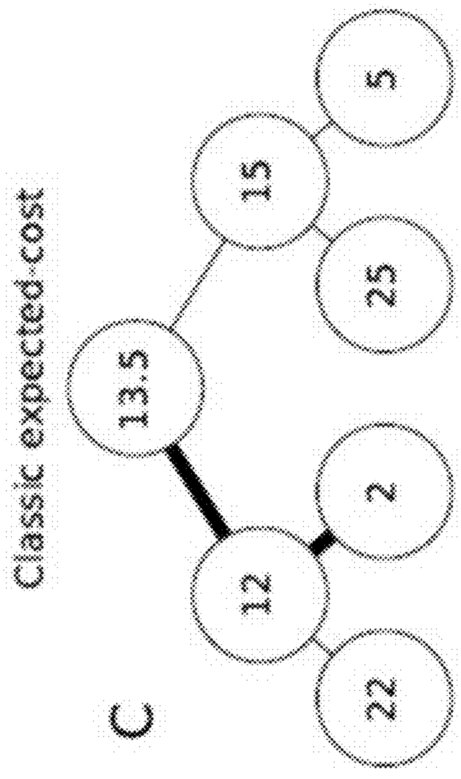
FIG. 2C is a diagram of the example policy tree showing the classic expected cost rule.

Traditionally, the expected cost assigned to node is normally the mean of each trial that has passed through it:

$$\bar{c}_i = \frac{1}{N_i}\sum_{k=1}^{N_i} c_{i,k} \quad (4)$$

where $\bar{c}_i$ is the expected cost of node i, $N_i$ is the total number of trials that have passed through node i, and $c_{i,k}$ is the kth final trial cost that passed through node i. This is referred to herein as the classic expected cost rule as shown in FIG. 2C.

Instead of just taking the mean of all terminal costs from all child nodes, one can optimistically take the best (lowest) child cost at each controlled choice, only averaging over the multiple stochastic costs at leaf nodes. The expected costs then bubble up from the bottom of the tree:

$$\bar{c}_i = \begin{cases} \min_{j \in Children(i)} \bar{c}_j & i \text{ is a branch} \\ 1/N_1 \sum_{k=1}^{N_i} c_i & i \text{ is a leaf} \end{cases} \quad (5)$$

Figure 2D:
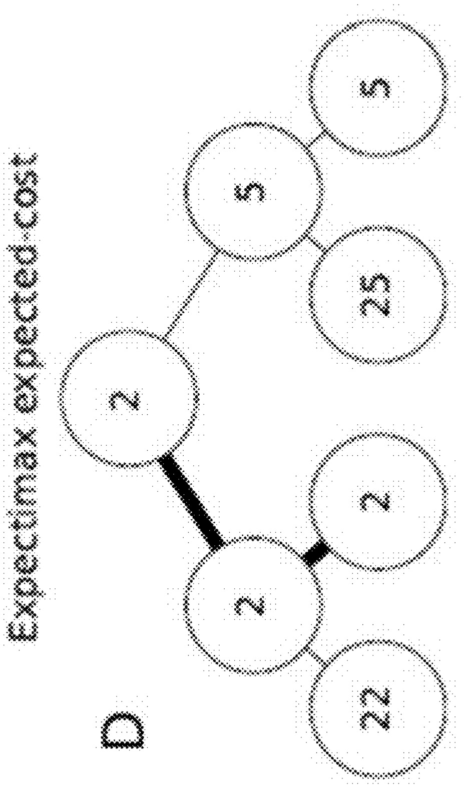
FIG. 2D is a diagram of the example policy tree showing an alternative expectimax expected cost rule.

This rule is called "expectimax" cost rule (although costs are minimized here instead of maximizing rewards) and was originally devised in the context of game tree search where the opponent plays stochastically. It is considered a generalization of minimax search, where the opponent is assumed to play optimally, and is shown in FIG. 2D.

Figure 2E:
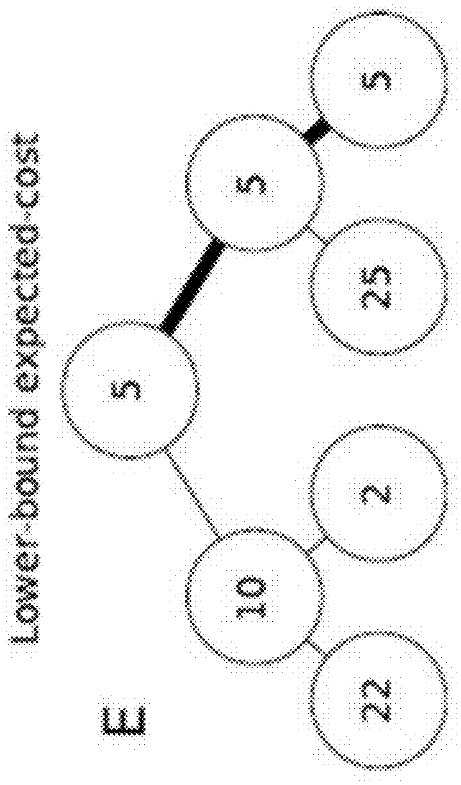
FIG. 2E is a diagram of the example policy tree showing an lower bound expected cost rule.

Taking advantage of known intermediate costs, it can be observed that the above rule can be over-optimistic in some cases. For example, imagine a node corresponding to a risky action that has a 50% chance of observing a high cost, and that has two child nodes, neither of which impose any costs. If one runs a trial for each of these children and gets a high cost for one and zero for the other, one would optimistically choose the best option and assign an expected cost of zero to the parent node, even though the true expected cost is high. However, when intermediate costs are known for each node, it is known that the high cost is attributable to the parent node and not to either of the children. One should not be deceived into believing that a low cost path exists for one of the children since the parent cost applies to both. A new expected cost rule can be devised that takes the cost of the best child and applies a lower bound of the mean partial/intermediate cost of the parent node:

$$\bar{c}_i = \max\left(\bar{p}_i, \begin{cases} \min_{j\in Children(i)} \bar{c}_j & i \text{ is a branch} \\ 0 & i \text{ is a leaf} \end{cases}\right) \tag{6}$$

where $\bar{p}_i$ is the mean partial/intermediate cost of node i. This expected cost rule is referred to as the "lower bound" rule and is shown in FIG. 2E.

Figure 2F:
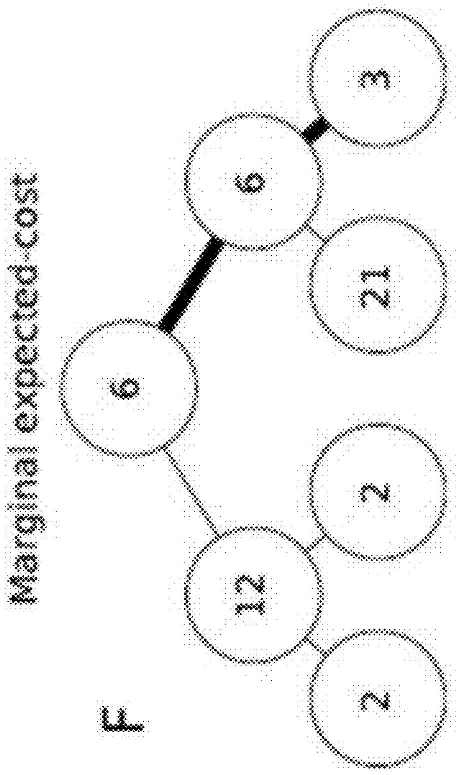
FIG. 2F is a diagram of the example policy tree showing a marginal expected cost rule.

Taking this idea of using additional information from intermediate costs even further, one can directly calculate and assign marginal costs to each node and use the sum of mean marginal costs along the best path through the tree as the total expected cost:

$$\bar{c}_i = \bar{m}_i + \begin{cases} \min_{j\in Children(i)} \bar{c}_j & i \text{ is a branch} \\ 0 & i \text{ is a leaf} \end{cases} \tag{7}$$

where $\bar{m}_i$ is the mean marginal cost of node i, equal to the mean intermediate cost of node i minus the mean intermediate cost of the parent, if any. Note a similarity to Q-learning in that the total expected value combines an immediate value with the best child node/successor state expected value. This expected cost rule is referred to marginal action cost or marginal expected cost and is shown in FIG. 2F.

In the example embodiment, a Monte Carlo tree search is used to evaluate the policy tree, for example as shown in Algorithm 1 below. Inputs to the algorithm include initial state $s_0$, uncertainty belief b, and policy set P. Other variables include p for policy, s for belief sample/initial conditions particle, n' for a child node of n, m for a marginal action cost, $m_n$ for the set of marginal action costs observed by node n, and $c_n$ for the expected cost of node n. In practice, an implementation of this algorithm preferably limits the number of repeated particles.

```
function CHOOSEPOLICY (s0, b, P)
|   n ← CREATENODE (s0)
|   k ← 0
|   for k < trial_budget ∨ continue for max — robust child
|   do
|   |   RECURSE (n, DRAWBELIEFSAMPLE (b), P)
|   |   k ← k + 1
|   end
|   return argp min c̄n', for child n' with policy p
function RECURSE (n, s, P)
|   if depth of n ≥ max depth then
|   |   return
|   end
|   if n not expanded then
|   |   //Add child nodes at depth + 1 for each policy in P
|   |   EXPAND (n, P)
|   end
|   n' ← KL − UCB (n)
|   if depth of n = 0 then
|   |   // Save/retrieve particles before forward simulation
|   |   if n' has unplayed particles then
|   |   |   s ← WORSTUNPLAYEDPARTICLE(n')
|   |   else
|   |   |   SAVEPARTICLE(n, s)
```

-continued

```
|   |   end
|   end
|   m ← FORWARDSIMULATE (n', s)
|   mn' ← mn' ∪ {m}// Track marginal costs
|   RECURSE(n', s, P)
|   c̄n ← MACEXPECTEDCOST(n, s)
```

At the start of each Monte Carlo trial, a set of initial conditions is sampled. This particle then takes some path through the tree, influencing the final cost of the trial. Some of these particles may be either lucky or unlucky, making the actions and path they take look unfairly better or worse than they actually are. For example, if all the obstacle vehicles either simultaneously avoid or crowd the ego vehicle, such that no matter the ego vehicle's policy choice, there is either no possible crash or an inevitable crash. The idea is that with enough trials and particles, these effects will average out to be fair in the end, resulting in a good outcome. However, when the number of trials is computationally limited, it may help if particles are intentionally repeated along different paths through the tree to reduce any bias resulting from this good or bad luck.

In the example embodiment, all particles, the paths they take, and their terminal costs are recorded. Because initial conditions are compact, this does not add up to a significant amount of information. In the ChoosePolicy function, the policy tree is recursively evaluated using the Recurse function until the number of trial exceeds a computational limit. Once the computational limit has been exceeded, the policy (or a path in the policy tree) having the best outcome is selected. In the example embodiment, the policy is elected by identifying a child node of the root node of the policy tree having smallest marginal expected cost and implementing the policy associated with the edge extending between the root node and the identified child node.

In the Recurse function, a child node for consideration is selected using the KL-UCB algorithm. Further details regarding the KL-UCB algorithm can be found in "The KL-UCB algorithm for Bounded Stochastic Bandits and Beyond" in Proceedings of the 24th Annual Conference on Learning Theory JMLR Workshop and Conference Proceedings, 2011 which is incorporated in its entirety herein by reference. Other types of upper bound confidence algorithms and variants thereof are also contemplated by this disclosure.

After a top-level action has been elected for the next trial, first check if there is a particle that has not gone down this path before. If so, repeat this particle instead of sampling a new one. If there are multiple particles, chose the one with the highest cost. Note that although it would be possible to perform particle repetition at any depth of the tree, it was found to be worthwhile only at the top level. The remainder of this functions includes performing the forward simulation for the selected child node with the particle, store the marginal costs and then bubble the marginal costs up through the policy tree from the child node. It is noted that the Recurse function ends when the node is a leaf node in the policy tree.

Once the computational budget is large enough, repeating particles for fairness will no longer be necessary. Instead, it may be more effective to only draw new particles to better marginalize uncertainty. While for smaller numbers of Monte Carlo trials it is helpful to repeat particles as much as possible, for large numbers it may be best to not repeat at all. It was found that the best number of particles to repeat appears to be inversely proportional to the total number of trials in the budget. This means that for an any-time implementation, it would be best to have an estimated budget before starting. A repetition constant is used to set the maximum number of particle repetitions to perform as the repetition constant divided by the number of trials in the budget.

To evaluate and compare the different expected-cost rules, UCB variations, and particle repetition, a variety of parameter sweeps were performed. When not sweeping over Monte Carlo trials, instead marginalize the number of trials with ten powers of two from 8 to 4,096. Perform enough complete runs of the algorithm to show significant results in the figures, where error bars indicate plus or minus one standard deviation of the mean (standard error).

Figure 3:
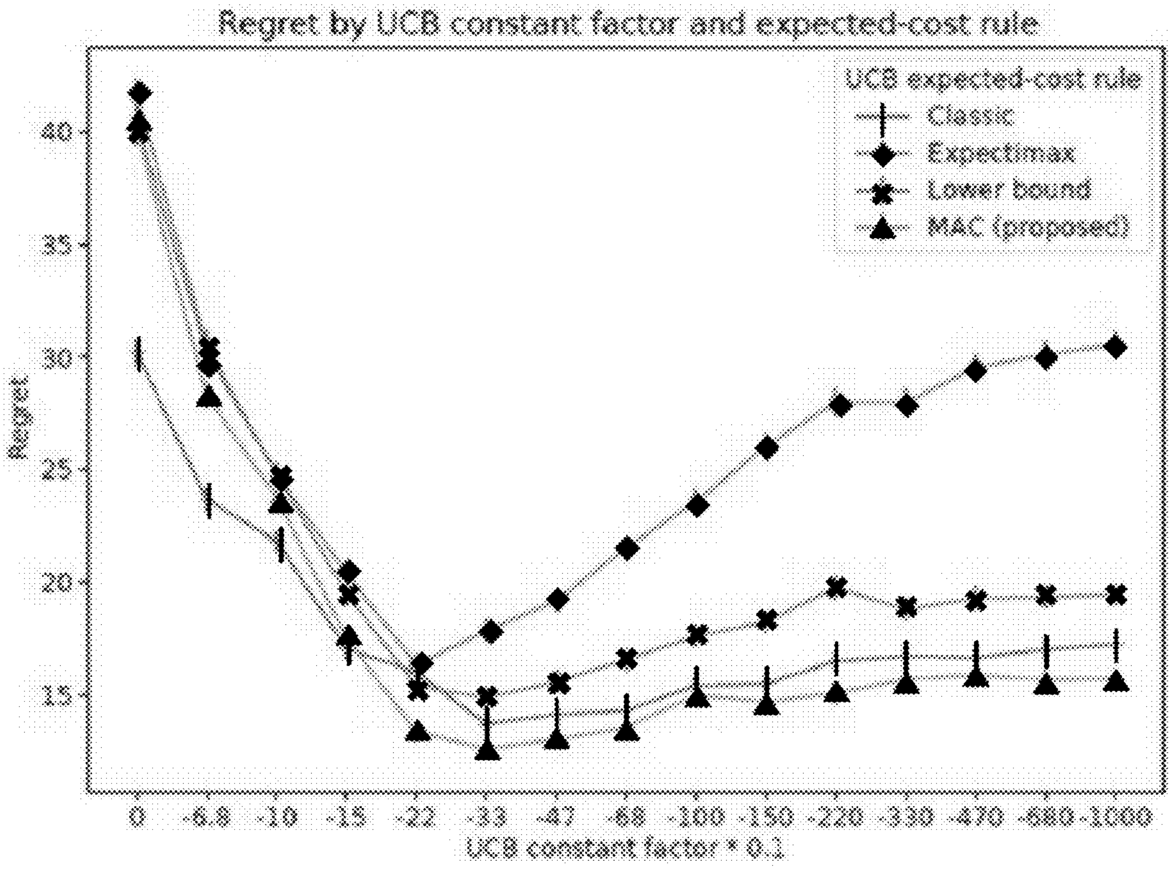
FIG. 3 is a graph showing the parameter sweep of UCB constant for each expected-cost rule, showing that the marginal action cost (MAC) and "classic" rules perform best.

For expected-cost rules, start by sweeping the UCB constant (a free parameter) for each expected-cost rule. FIG. 3 shows that the classic and MAC rules consistently outperform the expectimax and lower-bound rules, and that these differences persist even for large UCB constants which may encourage almost pure exploration. It is reasoned that these differences reflect the effect of the expected-cost rules not on exploration, but on final action selection.

Figure 4:
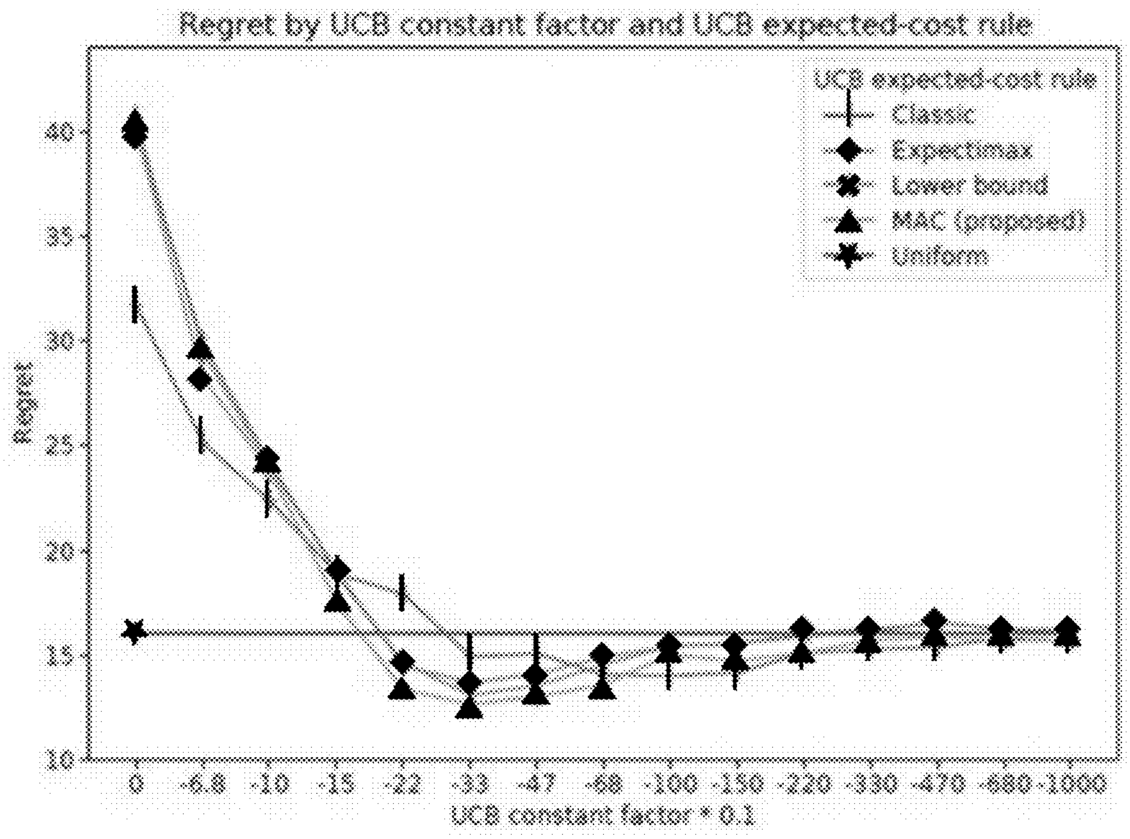
FIG. 4 is a graph showing the parameter sweep of UCB constant for each UCB expected cost rule, while using MAC for final action selection. We see that as UCB values increase, each rule's performance approaches that of uniform/pure exploration.

To tease apart how the expected-cost rules influences UCB and final action selection, the experiments were repeated using marginal action cost for final action selection, but still varying the expected-cost rule for UCB. In FIG. 4, this hypothesis is confirmed, that the MAC rule is most important for final action selection and that most of the expected cost rules work just as well with UCB. A uniform (pure exploration) rule is included for comparison.

Figure 5:
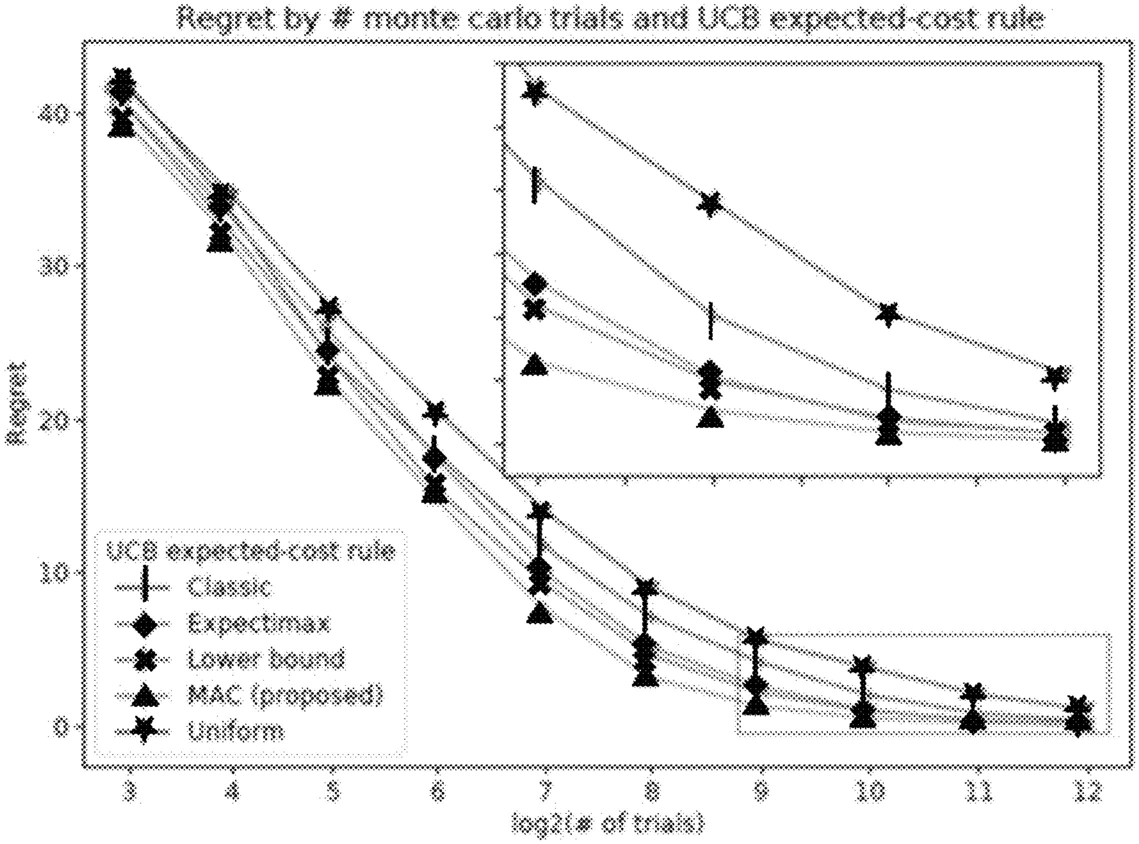
FIG. 5 is a graph showing the parameter sweep of Monte Carlo trials for each UCB expected-cost rule, while using MAC for final action selection. MAC achieves a low regret faster than the other rules. Thanks to also using the "max-robust child" rule to make a final decision at a good time, uniform exploration also does surprisingly well.

The expected cost rules are also compared by computational budget (number of Monte Carlo trials) as seen in FIG. 5. Each rule uses the best UCB constant for it as found in FIG. 4 and all use marginal action costs for final action selection. Note that marginal action costs converges close to zero mean regret much faster than the other rules.

Figure 6:
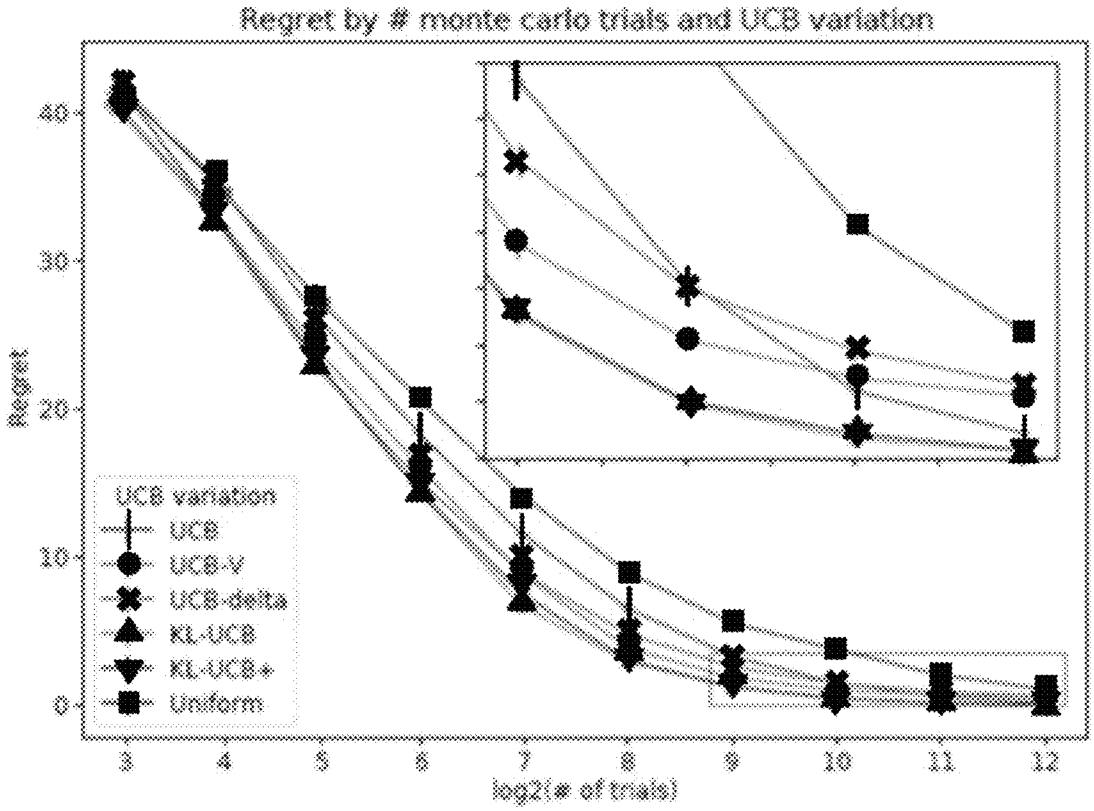
FIG. 6 is a graph showing the parameter sweep of Monte Carlo trials for each UCB variation, using MAC for expected-cost and final action selection. All the improved rules outperform UCB in most cases by about the same margin as UCB outperforms uniform exploration. KLUCB consistently performs best, with KL-UCB+ performing very similarly.

Acknowledging that there are many enhancements and alternatives to UCB, it is desirable to see if one of these would be able to improve performance. For this purpose, variants of UCB were implemented, including UCB-V, UCB (8), KL-UCB and variation KL-UCB+. Parameter sweeps were performed for each UCB variation to choose the parameters that produced the lowest regret for each, and then compared. in FIG. 6, it is seen that each improved variation performs fairly similarly and significantly better than UCB, although the relative differences start to widen with the highest numbers of trials. The KL-UCB rule is used for the remainder of this disclosure because of this advantage.

Figure 7:
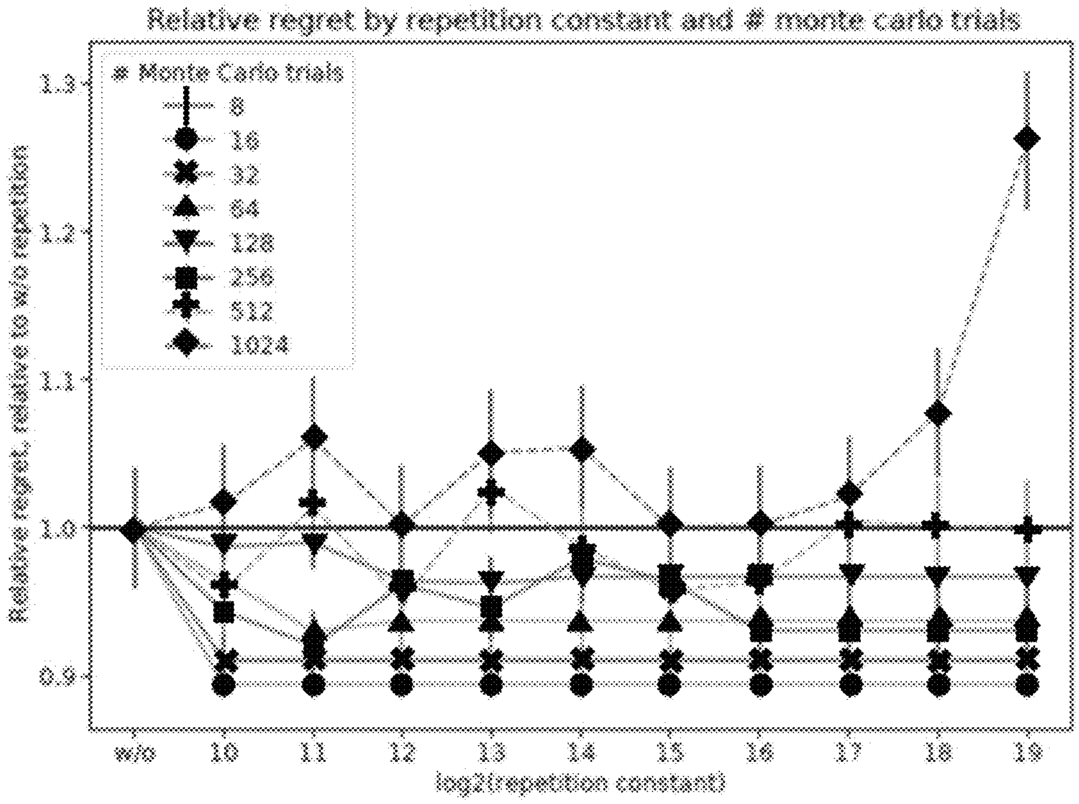
FIG. 7 is a graph showing a plot of relative regret (normalized by the no-repetition case), the particle-repetition constant, and the number of trials, showing that particle repetition is strictly beneficial at least up to 256 trials, with up to about a 10% reduction in regret. Note that the cases with 1,024+ trials all have very low absolute regret (see FIG. 8).

In FIG. 7, the repetition constant is swept and the relative regret is shown by normalizing by the regret of the w/o-repetition case. For most of the cases, it is seen that improvements saturate when particles are being repeated as much as possible. Intuitively, one would expect that particle repetition would become less important as the number of particles increases, since the effects of individual "unlucky" particles would be mitigated by the large number of particles. This behavior is seen for 1,024 Monte Carlo trials in the experiment. Because relative regret is plotted, the smaller the absolute regret, the larger the error bars. See the absolute regret trends in FIG. 8 where a repetition constant of $2^{16}$ is used.

Figure 9:
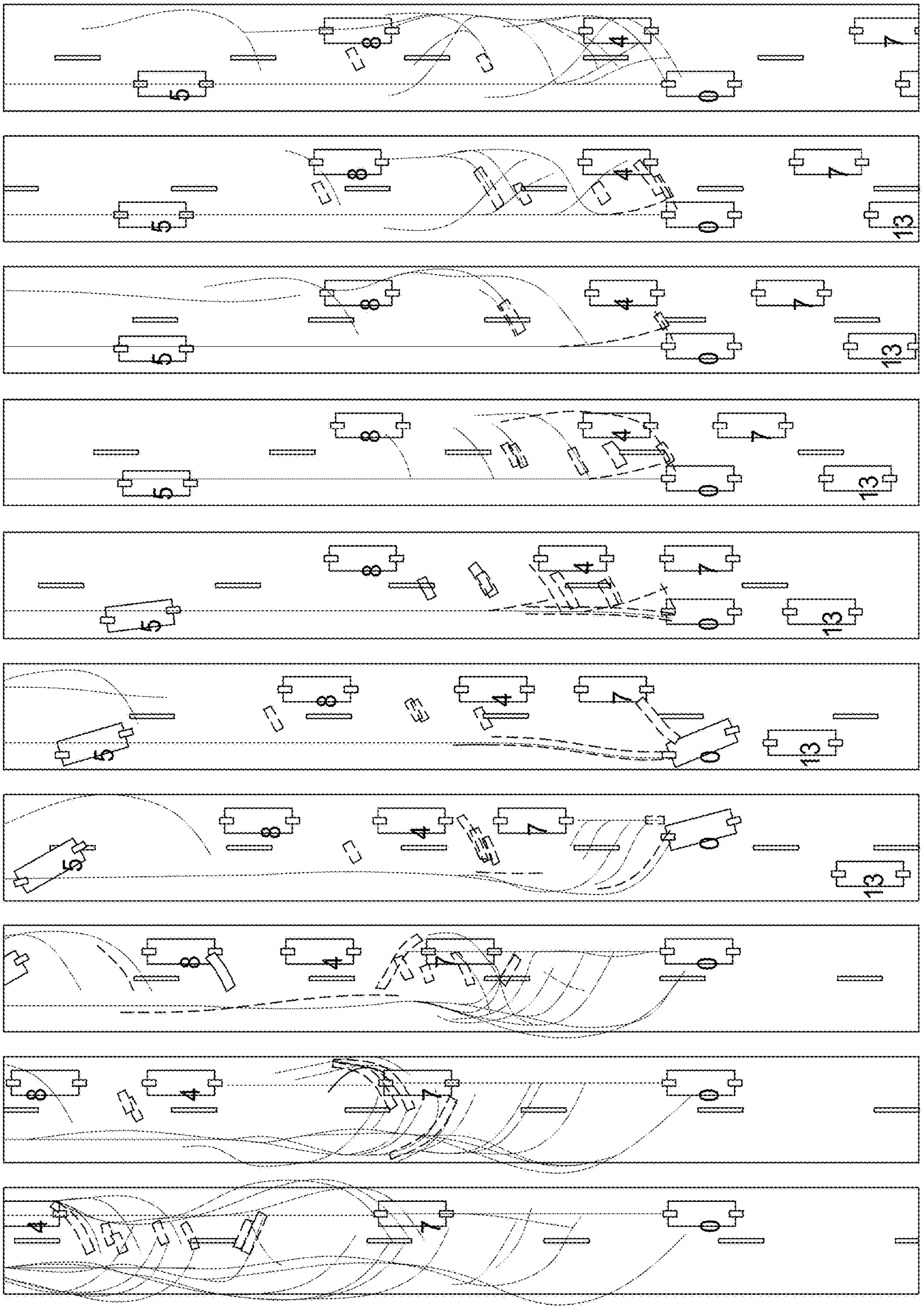
FIG. 9 is a picture showing MCPTDM passing a vehicle and keeping distance from others in our simulated road environment. Vehicle 4 comes to a stop ahead of vehicle 7, causing it to stop in ahead of the ego vehicle (number 0). The ego vehicle moves into the left lane, passes vehicle 7, and then keeps a slight distance behind vehicle 4. We see how MCPTDM both performs tactical passing to make forward progress and also prefers to keep distance from vehicle 4, just in case other vehicles behave erratically. Monte Carlo trials are shown by their forward-simulated traces. Frames are left-to-right in one-second increments.
Figure 10:
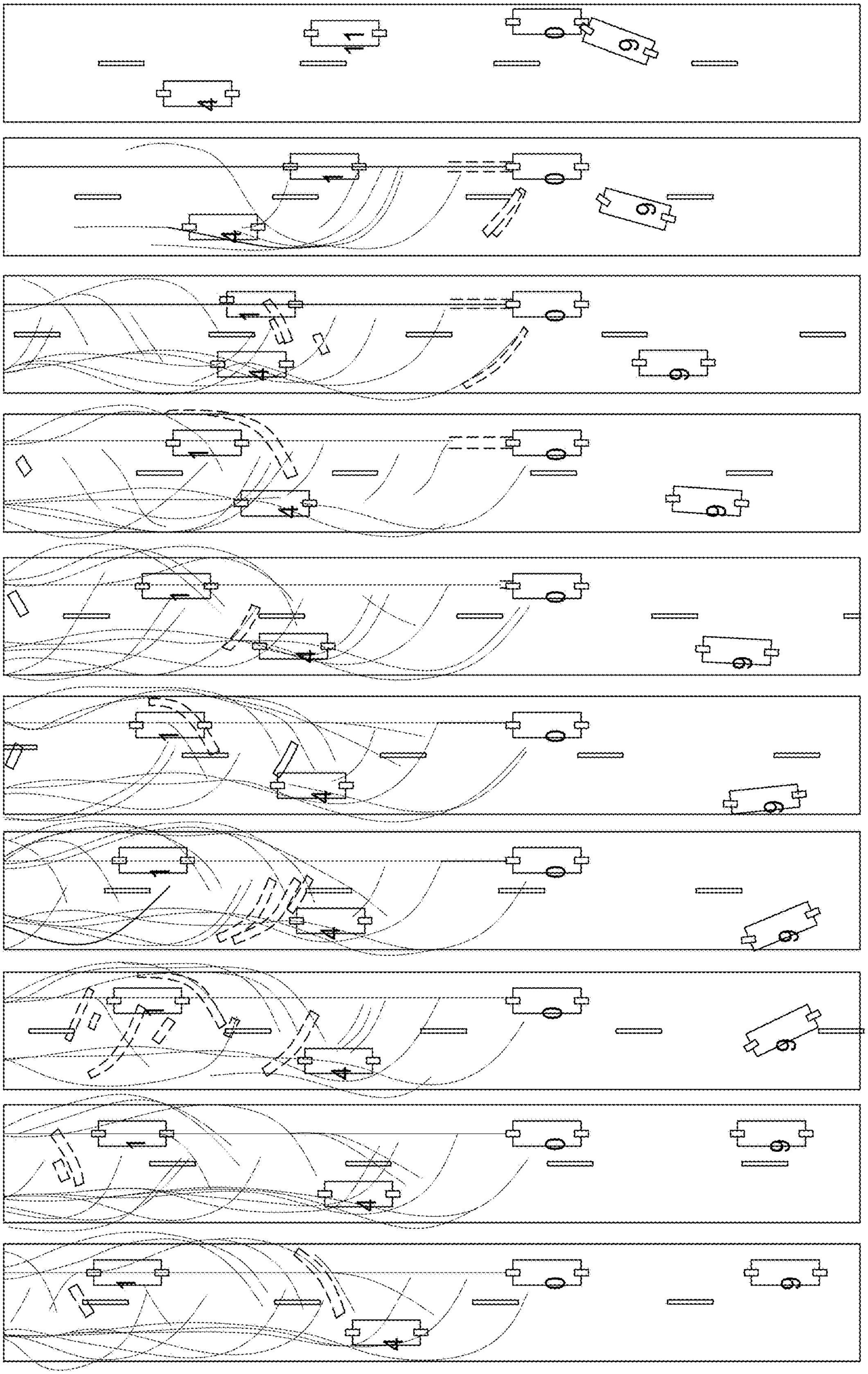
FIG. 10 is a picture showing MCPTDM experiencing a crash in our simulated road environment (compare to FIG. 9). As vehicle 11 comes to a stop in front of the ego vehicle, vehicle 9 from behind starts to make an unsafe lane-change into the right lane which the ego vehicle is unable to avoid. It is possible that the ego vehicle could avoid this crash if it were using a replanning rate of faster than 4 Hz. From the forward-simulated traces in the second-to-last frame, it appears that only scenarios with vehicle 11 accelerating first manage to avoid this crash, since the ego vehicle's intelligent driver model requires it to maintain a certain following distance. Frames are left-to-right in half-second increments.

Finally, an ablation study is performed in FIG. 9 to compare a traditional MCTS search with UCB and "max-robust child" final action selection to the enhanced method that adds in KL-UCB, MAC expected cost estimation, and finally particle repetition. Each addition significantly reduces regret, although at different points along the curve.

Figure 8:
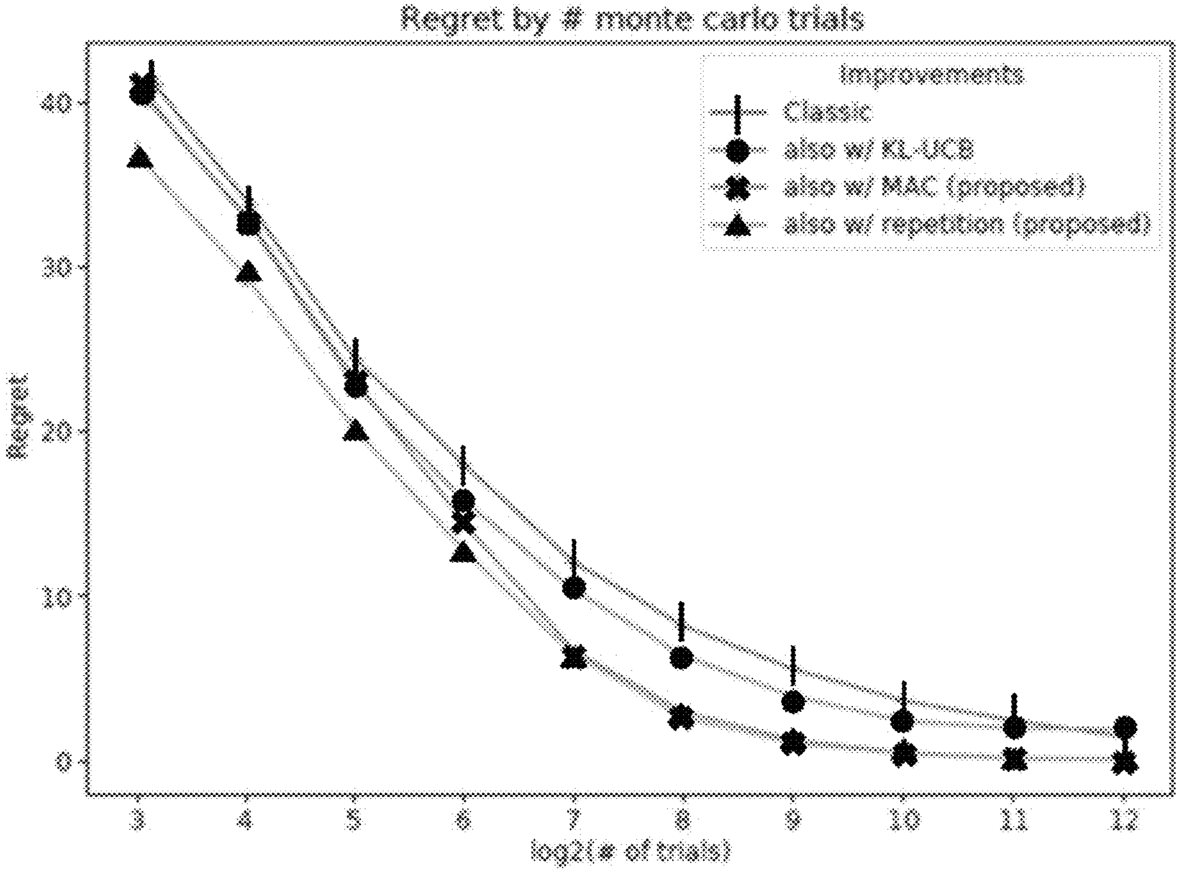
FIG. 8 is a graph showing an ablation study of our method, showing the advantage of starting from traditional MCTS using UCB and "max-robust child", then adding KL-UCB, marginal action costs (MAC), and finally also particle repetition. Our full enhanced method performs better than all the ablative cases.

For further evaluation, an autonomous driving scenario is adopted which is similar to that proposed by Zhang et al. in "Efficient Uncertainty-aware Decision-making for Automated Driving using Guided Branching" 2020 IEEE International Conference on Robotics and Automation, 2020, but with only two-lanes going in a single direction (see FIGS. 8 and 9). The scenario uses a bicycle model, the intelligent driver model, and pure pursuit lateral control for all vehicles, along with five policies: left-lane-maintain, left-lane-accelerate, right-lane-maintain, right-lane-accelerate, or decelerate. Electing a policy for a different lane than the current one causes a vehicle to perform a lane-change maneuver.

Besides the ego vehicle, 13 "obstacle" vehicles are simulated, and obstacle vehicles are removed and respawned so that 13 vehicles are maintained within a certain distance of the ego vehicle. This number of vehicles ensures that there may be complex interactions between multiple other vehicles both in front of and behind the ego vehicle, but also keeps the environment from being too congested. Each obstacle vehicle is parameterized by a random (within some range) preferred velocity, acceleration, and follow-time, to provide some variation and uncertainty in their behaviors. Every 0.2 seconds, each obstacle vehicle has a small chance of randomly choosing a new policy (5% probability each second). Because obstacle vehicle changes occur randomly, the policies used by the obstacle vehicles will first check that the next lane is clear at least a half-vehicle's length ahead and behind before making a lane-change maneuver. The policies used by the ego vehicle do not make this check so they can be more flexible.

The ego car tries to safely and smoothly maintain a target velocity by minimizing a cost function that incorporates velocity, safety, and control inputs:

$$C_{vel} = |v - v_{target} \tag{8}$$

$$C_{acc} = W_{acc}\dot{v}^2 \tag{9}$$

$$C_{steer} = W_{steer}\dot{\theta}^2 \tag{10}$$

$$C_{saftey} = W_{saftey}\left(1 + e^{-k_{safety}(d_{min} - d_{safety})}\right)^{-1} \tag{11}$$

$$C = \int (C_{vel} + C_{acc} + C_{steer} + C_{safety}) a^t \, dt \tag{12}$$

where v and θ are the ego vehicle's forward velocity and angle, $v_{target}$=11.2 m/s is the ego vehicle's target velocity (25 MPH), W are the cost weights, $d_{min}$ is the minimum distance between the ego vehicle and any other vehicle, $k_{safety}$ and $d_{safety}$ define the shape of a logistic sigmoid used for safety penalties, and α=0.8 is a discount factor.

Each obstacle vehicle may or may not be intending to perform a lane-change maneuver. From the perspective of the ego agent, this is hidden state and must be estimated in order to perform a forward rollout.

For simplicity, a stateless heuristic for belief estimation is implemented based on thresholds for the direction a vehicle is pointing, its position in its lane, and its velocity relative to the vehicle ahead of it. While this belief estimation leaves room for improvement, it should not affect the fairness of the method comparisons.

Classic multi-policy decision making (MPDM) comparison takes samples (according to the computational budget) from the belief state and closed-loop forward simulates them through each of our five policy choices for 8 seconds. Finally, the policy with the lowest mean cost is elected.

Efficient uncertainty-aware decision making (EUDM) is an extension to MPDM that includes both a specific tree search through the policies as well as a heuristic for selecting belief samples that represent the most important/risky cases.

The tree search used by EUDM, the "domain-specific closed-loop policy tree", allows for only one policy change in the planning horizon, and this change must happen below the root node of the tree. A policy tree with a depth of 4 and each layer taking 2 seconds is used so that the total horizon is 8 seconds. As policy changes must happen after the root node, EUDM has a built in hysteresis and will only actually change policies if it still wants to 2 seconds after first making that decision. The current EUDM-selected policy can be used as an input to a separate "spatio-temporal semantic corridor" trajectory generation module which produces the actual behavior for the ego vehicle. This extra module allows their ego vehicle to react to changing circumstances in a risk aware fashion even with the 2 seconds of policy hysteresis.

EUDM was modified to consider switching policies at any time, including immediately. This deviates from the original EUDM method, but it improves its performance.

The heuristic used by EUDM, "conditional focused branching" (CFB), selects nearby obstacle vehicles, filters to just the vehicles whose policies we are uncertain about, then performs open-loop forward simulations of each belief policy, and finally makes a set of the most likely belief samples formed by the Cartesian product of vehicles and policies for each obstacle vehicle deemed risky by the open loop simulations. All non-risky vehicles are assigned their most-likely policy.

In this implementation of EUDM, open-loop forward simulations are performed by giving only the ego and obstacle vehicle under examination dynamic policies, and simulate all the other vehicles with just a constant velocity. Obstacle vehicles are ordered according to their "risk", the difference between the minimum and maximum costs from each of the policy choices, and then choose the 4 most risky vehicles. Form the Cartesian product of these risky obstacle vehicles and their policies and then finally select the most probable scenarios according to our belief, and weight them according to their probabilities. As many scenarios as allowed are taken within the computational budget.

A final method for application to the automated driving scenario uses the improvements from the synthetic experiments described above: marginal action cost (MAC), expected-cost estimation and particle repetition. KL-UCB and "max-robust child" selection are used just as in the earlier experiments. In addition, when expanding a node in the search tree, first explore the child with the same policy as the parent, since most of the time the ego vehicle will be maintaining its current policy.

For experiments, perform 16,384 runs for each method in order to get significant results. To complete all these runs in a reasonable time frame, limit each run to 30 simulated seconds and replan at 4 Hz. Runs are performed on a 2.5 GHz Intel Xeon E5-2640 with a single thread for each run so that multiple runs can be performed in parallel.

To make fair comparisons, plot the final cost observed in each run (with no discount) against the 95% computational latency. That is, 95% of the replanning periods of a 30 second run will have a latency less than this. The closer a method is to the bottom left corner (closer to zero cost and zero time), the better.

Over a total of 589,824 30-second long runs to make all of these figures, there were a total of 2,573 crashes (0.44%). Because crashes are both relatively rare and also lead to much higher final costs, the error bars are relatively large in some of the figures.

Figure 11:
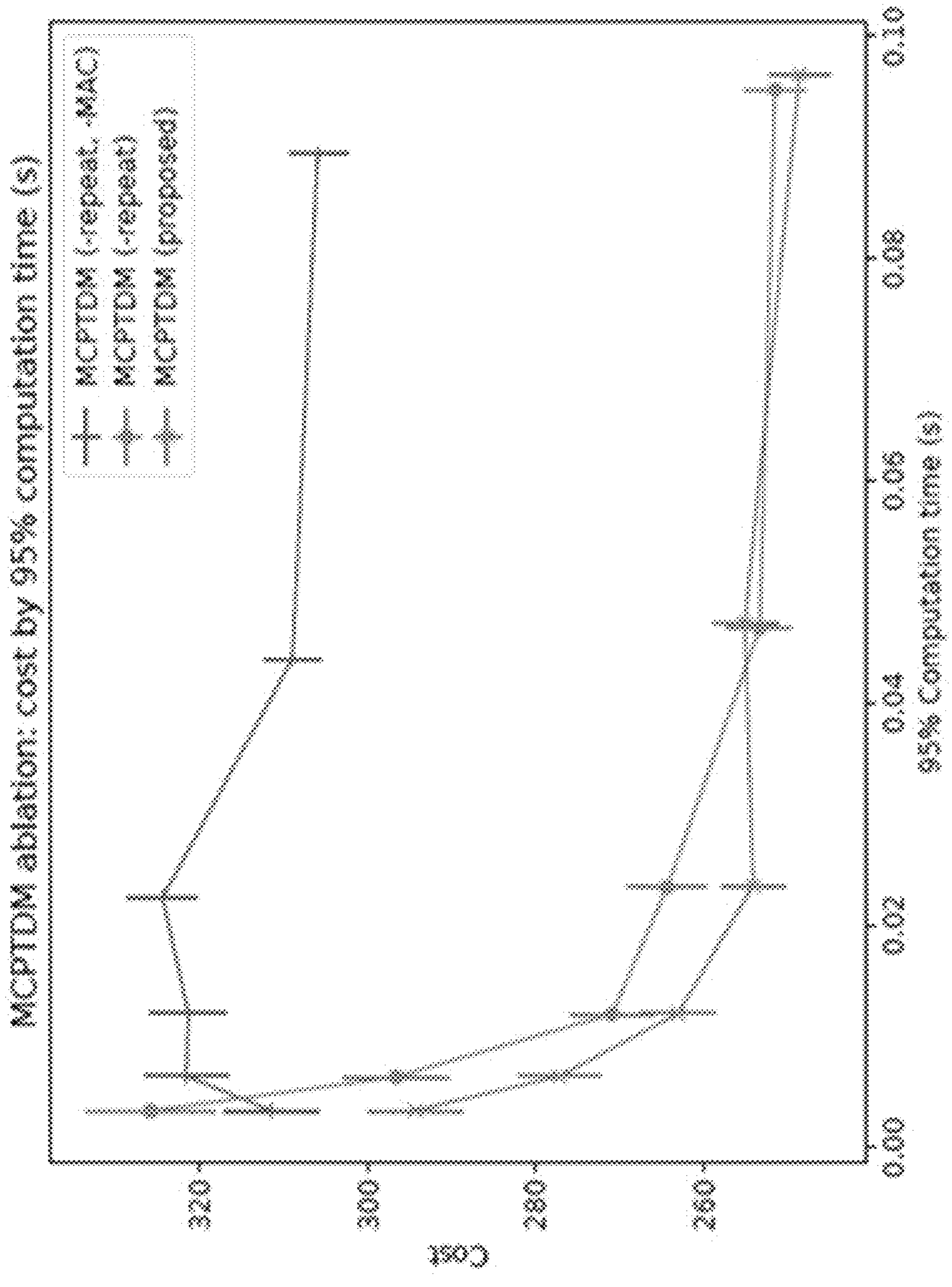
FIG. 11 is a graph showing the performance of an ablation of MCPTDM by evaluating it without particle repetition and then also with "classic" expected cost estimation instead of marginal action costs. We see that both improvements are significant.

First, perform an ablation to see the separate contributions of MACs and particle repetition. A parameter sweep was performed to determine reasonable constants for KLUCB (for the full method) and for particle repetition, and found that it did best when repeating as much as possible. In FIG. 11, both MACs and particle repetition result show significant improvements.

Figure 12:
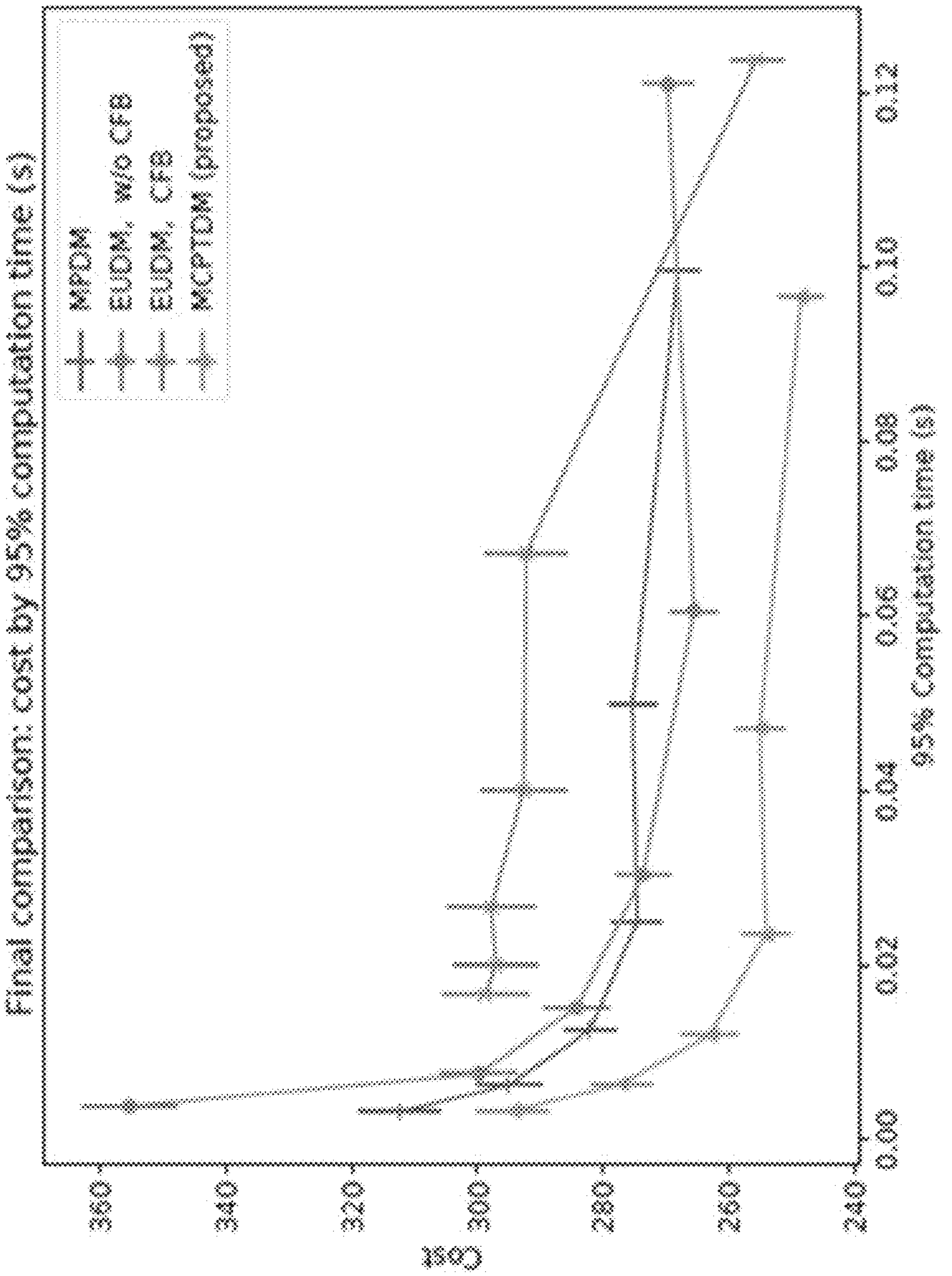
FIG. 12 is a graph showing the final comparison of MCPTDM with EUDM (both with and without the CFB heuristic) and MPDM. MCPTDM achieves either significantly lower final cost or significantly lower computational time than either EUDM or MPDM.
Figure 14:
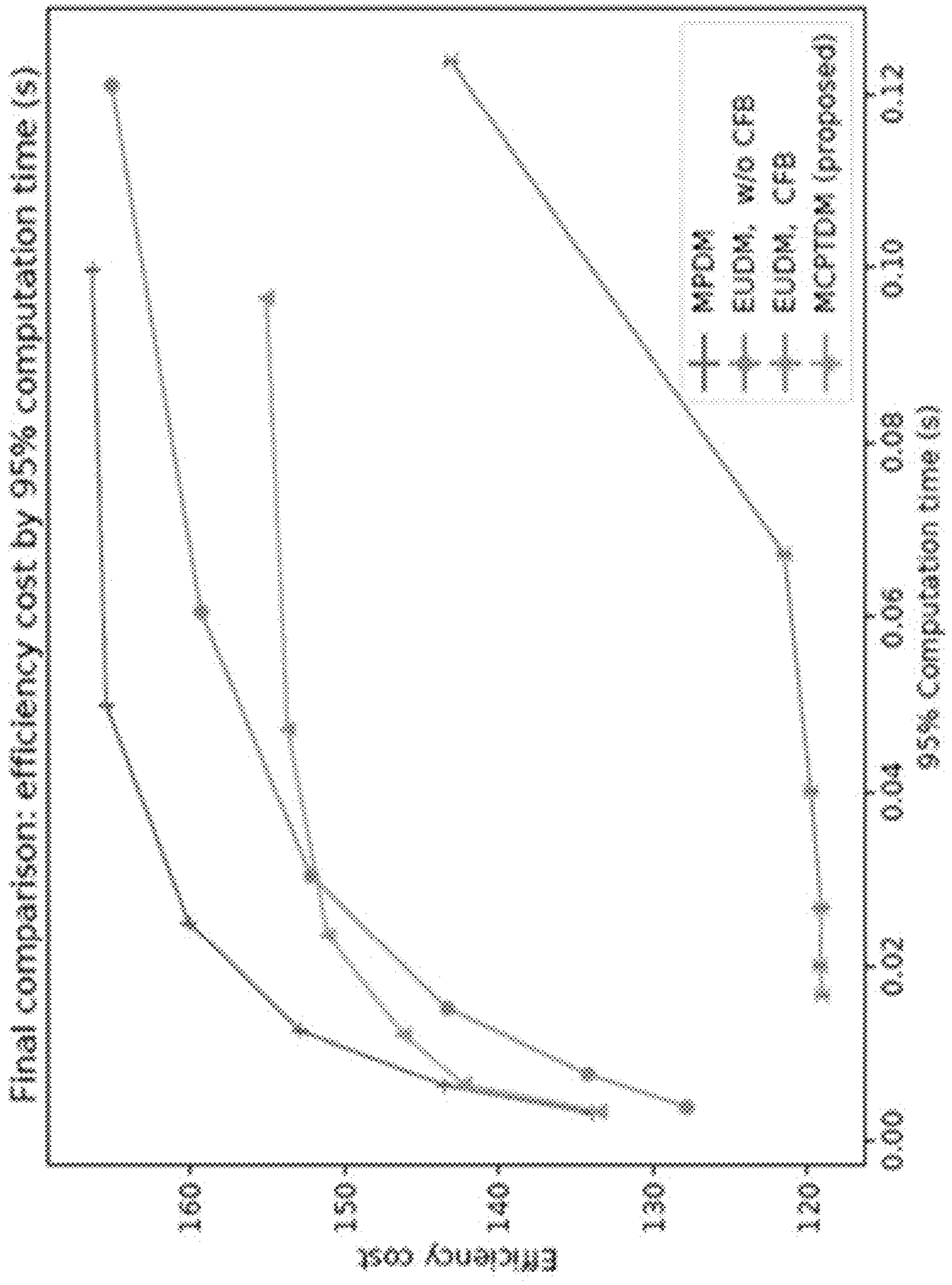
FIG. 14 is a graph showing a comparison of just the final efficiency cost (lower is better) between each method.

Finally, perform a comparison of the proposed MCPTDM method to the baseline methods of MPDM and EUDM in FIG. 12. MCPTDM achieves significantly lower cost for similar computational time. The cost function is composed of a safety cost (for avoiding crashes and being too close), an efficiency cost (for being close to a target velocity), and steering and acceleration costs (for minimizing control inputs), where the safety and efficiency are the most significant. Compare just the safety and efficiency costs in FIGS. 13 and 14, and note that the majority of the lower cost improvements of MCPTDM against MPDM and EUDM come from keeping efficiency without sacrificing safety. Intuitively it makes sense that in most cases increased safety (lower safety cost) comes with worse efficiency (lower average velocity and a higher efficiency cost).

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for issuing a command to a controlled object in a monitored environment, comprising:

at a current timestep, receiving a plurality of candidate initial state estimates for the controlled object and one or more monitored objects in the monitored environment, wherein the plurality of candidate initial state estimates are sampled from an uncertainty belief of a current state of the controlled object and the one or more monitored objects, and wherein each respective candidate initial state estimate includes state elements indicative of states at the current timestep, and the respective state elements are indicative of positions for the respective objects at the current timestep, velocities for the respective objects at the current timestep and intents of the respective objects at the current timestep;

for an evaluation period comprising a set of future timesteps, constructing a policy tree for evaluating actions taken by the controlled object during the evaluation period, such that each level of the policy tree represents a time interval during the evaluation period, each edge of the policy tree represents a policy to be followed by the controlled object, and each node of the policy tree stores an indicator of outcomes for the controlled object following policies defined by a respective path to the respective node, wherein policies are selected from a set of possible policies;

based on a score associated with a traversal path through the policy tree, selecting an initial state estimate for the current timestep from the plurality of candidate initial state estimates, wherein the traversal path is determined using the initial state estimate for the current timestep;

generating one or more state estimates for the controlled object and the one or more monitored objects from the initial state estimate, where each state estimate in the one or more state estimates includes state elements, and the respective state elements of the respective state estimate are indicative of positions for the respective objects, velocities for the respective objects and intents of the respective objects;

evaluating outcomes of one or more paths in the policy tree using the one or more state estimates;

selecting a given path in the policy tree having a best outcome for the controlled object, where the given path indicates a sequence of policies to be followed by the controlled object during the evaluation period; and issuing a command to the controlled object in accordance with the sequence of policies.

2. The method of claim 1, wherein the policy tree is constructed prior to evaluating outcomes of one or more paths in the policy tree.

3. The method of claim 1, further comprises evaluating outcomes of the one or more paths in the policy tree using a Monte Carlo tree search.

4. The method of claim 1, wherein the policies in the set of possible policies includes maintain velocity in current lane, change to lane on right, change to lane on left and decelerate.

5. The method of claim 1, wherein evaluating outcomes of one or more paths in the policy tree further comprises:

evaluating a given path in the policy tree with a given state estimate, yielding a cost at each node in the given path in accordance with a cost function; and assigning an expected cost to each node in the given path, where the expected cost at a given node in the given path is determined by computing a mean expected cost at each leaf node which depends from the given node and setting the expected cost for the given node equal to average of mean expected costs at each leaf node which depends from the given node.

6. The method of claim 5, further comprising storing one of the cost associated with a node at a corresponding node on the given path or a marginal cost associated with a node at a corresponding node on the given path.

7. The method of claim 1, wherein evaluating outcomes of one or more paths in the policy tree further comprises:

evaluating a given path in the policy tree with a given state estimate, yielding a cost at each node in the given path in accordance with a cost function; and assigning a marginal expected cost to each node in the given path, where the marginal expected cost at a given node is set to mean of marginal costs resulting from evaluating state estimates at the given node plus marginal expected cost from a particular child node of the given node, such that marginal expected cost of the particular child node is smallest amongst the child nodes of the given node.

8. The method of claim 7, wherein selecting the given path in the policy tree having the best outcome for the controlled objected comprises identifying a child node of the root node of the policy tree having smallest marginal expected cost and implementing policy associated with the edge extending between the root node and the identified child node.

9. The method of claim 1, wherein evaluating outcomes of one or more paths in the policy tree includes evaluating each child node of the root node of the policy tree with a first state estimate chosen from the plurality of state estimates before evaluating paths in the policy tree using another state estimate which differs from the first state estimate.

10. The method of claim 1, further comprising, for each of a number of iterations, re-using the initial state estimate to determine a respective new path to a respective different node within the policy tree, wherein the number of iterations is determined based on a predetermined availability of computational resources.

11. A computer-implemented method for issuing a command to a controlled object in a monitored environment, comprising:

receiving, by a computer processor, at a current timestep, a plurality of candidate initial state estimates for the controlled object and one or more monitored objects in the monitored environment, wherein the plurality of candidate initial state estimates are sampled from an uncertainty belief of a current state of the controlled object and the one or more monitored objects, wherein each respective initial state estimate includes state elements, and the respective state elements are indicative of positions for the respective objects, velocities for the respective objects and intents of the respective objects;

constructing, by the computer processor, a policy tree for evaluating actions taken by the controlled object during an evaluation period, such that each level of the policy tree represents a time interval during the evaluation period, each edge of the policy tree represents a policy to be followed by the controlled object, and each node of the policy tree stores an indicator of outcomes for the controlled object following policies defined by a respective path to the respective node, wherein policies are selected from a set of possible policies;

determining a cost associated with a traversal path through the policy tree, wherein the traversal path is determined using an initial state estimate from the plurality of state estimates; based on the cost being higher than costs associated with traversal paths determined using other candidate initial state estimates, selecting an initial state estimate from the plurality of candidate initial state estimates;

generating, by the computer processor, one or more state estimates for the controlled object and the one or more monitored objects from the initial state estimate, where each state estimate in the one or more state estimates includes state elements, and the respective state elements of the respective state estimate are indicative of positions for the respective objects, velocities for the respective objects and intents of the respective objects;

evaluating, by the computer processor, outcomes of one or more paths in the policy tree using the one or more state estimates and a Monte Carlo tree search;

identifying a child node of the root node of the policy tree having smallest expected cost; implementing policy associated with the edge extending between the root node and the identified child node; and issuing a command to the controlled object in accordance with the implemented policy.

12. A non-transitory computer-readable medium having computer-executable instructions that, upon execution of the instructions by a processor of a computer, cause the computer to perform:

receiving a plurality of candidate initial state estimates for a controlled object and one or more monitored objects in a monitored environment for a current timestep, wherein the plurality of candidate initial state estimates are sampled from an uncertainty belief of a current state of the controlled object and the one or more monitored objects, wherein each respective candidate initial state estimate includes state elements, and the respective state elements are indicative of positions for the respective objects, current velocities for the respective object and current intents of the respective objects;

constructing a policy tree for evaluating actions taken by the controlled object during an evaluation period, such that each level of the policy tree represents a time interval during the evaluation period, each edge of the policy tree represents a policy to be followed by the controlled object, and each node of the policy tree stores an indicator of outcomes for the controlled object following policies defined by a respective path to the respective node, wherein policies are selected from a set of possible policies;

based on a score associated with a traversal path through the policy tree, selecting an initial state estimate for a current timestep from the plurality of candidate initial state estimates, wherein the traversal path is determined using the initial state estimate;

generating one or more state estimates for the controlled object and the one or more monitored objects from the initial state estimate, where each state estimate in the one or more state estimates includes state elements, and the respective state elements of the respective state estimate are indicative of positions for the respective objects, velocities for the respective objects and intents of the respective objects;

evaluating outcomes of one or more paths in the policy tree using the one or more state estimates;

selecting a given path in the policy tree having a best outcome for the controlled object, where the given path indicates a sequence of policies to be followed by the controlled object during the evaluation period; and issuing a command to the controlled object in accordance with the sequence of policies.

13. The non-transitory computer-readable medium of claim 12, wherein the policy tree is constructed prior to evaluating outcomes of one or more paths in the policy tree.

14. The non-transitory computer-readable medium of claim 12, wherein the computer program instructions cause the computer to further perform: evaluating outcomes of the one or more paths in the policy tree using a Monte Carlo tree search.

15. The non-transitory computer-readable medium of claim 12, wherein the policies in the set of possible policies includes maintain velocity in current lane, change to lane on right, change to lane on left and decelerate.

16. The non-transitory computer-readable medium of claim 12, wherein the computer program instructions cause the computer to further perform:

evaluating a given path in the policy tree with a given state estimate, yielding a cost at each node in the given path in accordance with a cost function; and assigning an expected cost to each node in the given path, where the expected cost at a given node in the given path is determined by computing a mean expected cost at each leaf node which depends from the given node and setting the expected cost for the given node equal to average of mean expected costs at each leaf node which depends from the given node.

17. The non-transitory computer-readable medium of claim 16, wherein the computer program instructions cause the computer to further perform: storing one of the cost associated with a node at the corresponding node on the given path or a marginal cost associated with a node at the corresponding node on the given path.

18. The non-transitory computer-readable medium of claim 12, wherein the computer program instructions cause the computer to further perform:

evaluating a given path in the policy tree with a given state estimate yielding a cost at each node in the given path in accordance with a cost function; and assigning a marginal expected cost to each node in the given path, where the marginal expected cost at a given node is set to mean of marginal costs resulting from evaluating state estimates at the given node plus marginal expected cost from a particular child node of the given node, such that marginal expected cost of the particular child node is smallest amongst the child nodes of the given node.

19. The non-transitory computer-readable medium of claim 18, wherein the computer program instructions cause the computer to further perform selecting a given path in the policy tree having the best outcome for the controlled object by identifying a child node of the root node of the policy tree having smallest marginal expected cost and implementing policy associated with the edge extending between the root node and the identified child node.

20. The non-transitory computer-readable medium of claim 12, wherein the computer program instructions cause the computer to further perform evaluating each child node of the root node of the policy tree with a first state estimate chosen from the plurality of state estimates before evaluating paths in the policy tree using another state estimate which differs from the first state estimate.

* * * * *